United States Patent [19]
Schriefer et al.

[11] Patent Number: 5,509,760
[45] Date of Patent: Apr. 23, 1996

[54] METHOD OF RAPID PURGING OF CONTAMINANTS FROM A CONTAMINATED AREA OF SOIL OR GROUND WATER

[75] Inventors: Fred E. Schriefer; Robert Bass; Stephen G. McMahon, all of Jacksonville, Fla.

[73] Assignee: Integrated Environmental Solutions, Inc., Jacksonville, Fla.

[21] Appl. No.: 226,991

[22] Filed: Apr. 12, 1994

[51] Int. Cl.⁶ ............................................. F02D 3/00
[52] U.S. Cl. .................. 405/258; 405/128; 166/245; 166/305.1; 166/310
[58] Field of Search .................... 405/128, 129, 405/258, 52; 166/245, 305.1, 310

[56] References Cited

U.S. PATENT DOCUMENTS

| | | | |
|---|---|---|---|
| 4,435,292 | 3/1984 | Kirk et al. | 210/747 |
| 4,832,122 | 5/1989 | Corey et al. | 166/266 |
| 4,842,448 | 6/1989 | Koerner et al. | 405/258 |
| 5,011,329 | 4/1991 | Nelson et al. | 405/128 |
| 5,032,042 | 7/1991 | Schuring et al. | 405/258 |
| 5,076,727 | 12/1991 | Johnson et al. | 405/128 |
| 5,161,914 | 11/1992 | Rahn et al. | 405/128 |
| 5,178,491 | 1/1993 | Graves et al. | 405/128 |
| 5,193,934 | 3/1993 | Johnson et al. | 405/128 |
| 5,221,159 | 6/1993 | Billings et al. | 405/128 |
| 5,246,309 | 9/1993 | Hobby | 405/128 |
| 5,249,888 | 10/1993 | Braithwaite et al. | 405/128 |
| 5,251,700 | 10/1993 | Nelson et al. | 166/305.1 |
| 5,263,795 | 11/1993 | Corey et al. | 405/128 |
| 5,277,518 | 1/1994 | Billings et al. | 405/128 |
| 5,288,169 | 2/1994 | Neeper | 405/128 |

FOREIGN PATENT DOCUMENTS

| | | | |
|---|---|---|---|
| 3601490 | 7/1987 | Germany | 405/128 |

*Primary Examiner*—John A. Ricci
*Attorney, Agent, or Firm*—Sughrue, Mion, Zinn, Macpeak & Seas

[57] ABSTRACT

A remediation method for decontamination of soil and groundwater that puts maximum remediation stress on the entire area and volume of contamination. This results in site restoration in days and weeks. The target contaminants are organic compounds such as hydrocarbon constituents associated with diesel fuel, gasoline, kerosene, solvents and creosote. Cleanup concentrations to non-detectable levels can be achieved when properly implemented. Positive pressure is used to push an uncontaminated gas throughout the entire contaminated area/volume. When contacting the contaminated area, volume and media, this gas becomes a carrier gas, stripping the contaminants and carrying them to ground level where they can be collected and treated or dissipated to the atmosphere. The method incorporates air entry points (vertical, horizontal, or directional) installed to a depth below the contamination, combined with a predetermined air entry point spacing (depth/spacing ratio). Use of an operating duty cycle enhances contaminant yield from the groundwater, the soil matrix below the groundwater table, and the soil above the groundwater table. Horizontal migration of contaminants during the process is prevented by the use of gas entry points around a boundary perimeter of the zone being purged. One or two days' use of the method produces the same results as one year of other remediation methods, such as "pump and treat". Transfer or removal rates of 40% to 50% per day of the existing contaminants are normal. No (vacuum) extraction wells are necessary to make this in-situ method work. Biodegradation is not a factor. Progress is measured by the amount of contaminants remaining. Site rehabilitation to regulatory standards, measured in micrograms per liter or parts per billion, can be achieved within weeks.

30 Claims, 9 Drawing Sheets

△ TREATMENT POINT
 (AIR ENTRY WELL)

□ AIR EXIT POINT

AIR ENTRY WELLS WERE 25 ft DEEP, 18 ft APART.
GROUNDWATER CLEANUP TIME WAS 7 DAYS.
CONTAMINANTS WERE BTEX + MTBE.

CONTAMINANT REDUCTION RATES IN SOILS

METHOD OF RAPID PURGING OF CONTAMINANTS FROM A CONTAMINATED AREA OF SOIL OR GROUND WATER

BACKGROUND OF THE INVENTION

The present invention relates primarily to methods use in site-rehabilitation efforts of ground water and/or soil contaminated with organic compounds such as hydrocarbon constituents associated with diesel fuel, gasoline, kerosene, solvents and creosote.

At the present time, site remediation for hydrocarbon constituents takes years and decades. The most widely used aquifer remediation technology is known as "pump and treat". This consists of extracting (pumping) groundwater from recovery well(s), and pumping it to an above-ground treatment system, removing the contaminants from the extracted groundwater, and re-infiltrating the now uncontaminated groundwater back to the aquifer or discharging to a surface water body. This method has had an extremely poor success rate and is now projected by the EPA to take 30 years of operation per site to achieve target levels. This method also has proven to be inefficient and not cost effective. Due to the contaminated soil matrix below the water table, the diffusion of contaminants from the soil matrix to the groundwater continuously re-contaminates the groundwater, thereby resulting in site rehabilitation efforts to be measured in decades. The pump and treat method's cleanup times are dependent on aquifer permeability, and on natural diffusion rates from the soil matrix to the pore water, and this method does not address the soil contamination above the water table. Remediation stress on the contaminated area dissipates drastically with distance from the recovery well.

Another popular method, often used separately or in conjunction with "pump and treat", is soil vacuum extraction. This method consists of extracting subsurface vapors from the soil above the water table via a vacuum pump. However, this extraction step has little or no effect on remediating any associated groundwater. Further, it is dependent on the natural soil diffusion rates for releasing contaminants from the soil to the air in the pore space. Remediation stress dissipates drastically with distance from the vapor extraction point.

In-situ biodegradation of soil and groundwater is a remediation technique that has gained attention but has had little or no success in achieving cleanup target standards. This method is a "livestock nurturing" approach that introduces bacteria (micro-organisms) or enhances the naturally occurring bacteria to eat or break down the contaminants. For in-situ conditions, this is a very slow process and has had little or no success in achieving normal regulatory cleanup target levels, particularly in the microgram-per-liter or parts-per-billion range. It is also questionable as to how much remediation stress this method applies to the contaminated area, particularly after the initial contaminant concentration reduction.

Because the pump and treat, soil vacuum extraction, and in-situ biodegradation methods are extremely slow processes that depend on subsurface conditions or yields, and require years of implementation at the site, they can be considered as "passive" remediation methods. These methods apply their maximum remediation stress to small, selected portions of the contaminated area, and little or no remediation stress to the larger percentage of the contaminated area. Furthermore, the amount of remediation stress these methods put on their selected areas is well below the level of remediation stress or intensity produced by our invention.

A known "active" remediation process is soil excavation. Although this process is successful on soil above the water table, it has significant remediation limitations on soil or groundwater in the underlying aquifer. If soil below the water table is removed, remaining contaminated groundwater in the aquifer will re-contaminate the backfill below the water table, thereby resulting in the creation of additional contaminated soil.

The published prior art does not present efficient and effective methods to achieve typical Federal and State site restoration standards in a short period of time, particularly when contaminated groundwater is involved.

For example, U.S. Pat. No. 5,221,159 (Billings et al) requires vacuum extraction in conjunction with oxygenated air injection, plus natural and enhanced biodegradation. This patent specifically indicates a reliance solely on biodegradation to address diesel constituents, and also specifically states that site remediation time is measured in terms of years, thereby indicating that maximum remediation stress is not achieved. U.S. Pat. No. 5,277,518 (Billings et al), a continuation-in-part, discloses a venting/collection system for air emissions, and requires a vent well within 200 feet on an air entry point. Both of these patents can be considered as being directed to passive techniques.

U.S. Pat. No. 4,435,292 (Kirk) requires simultaneous air injection and evacuation in a closed loop system for mass transfer of the contaminants to the carrier gas. Extraction via negative pressure (vacuum points) is critical to this method.

U.S. Pat. No. 4,842,448 (Koerner) uses gas injection and its forced extraction from the soil, but requires impermeable horizontal and vertical barriers around the contaminated area. This method is based on pressure reduction (vacuum) to draw out the carrier gas.

U.S. Pat. No. 4,832,122 (Corey et al) uses in-situ gas injection and vacuum extraction to address volatile contaminants in groundwater. This method requires significant negative pressure/vacuum to draw the injected gas across the contaminated groundwater. U.S Pat. No. 5,263,795 (Corey et al) is somewhat of an extension of the '122 patent but addresses metal contamination, relies on bio-degradation, and treats contaminants in-situ without removal.

U.S. Pat. No. 5,076,727 (Johnson et al) describes a closed loop system of injection and vacuum withdrawal, designed to heat the soil with microwaves, thereby causing release of nonvolatile hydrocarbon contaminants. The patent states that negative pressure (vacuum) is needed to withdraw the vapors, and requires an impermeable surface. U.S. Pat. No. 5,193,934 (Johnson et al) also describes a process designed to heat the soil and vaporize the hydrocarbons, but this version inserts hot combustion products into soil under negative pressure conditions in a closed loop system with an impermeable surface.

U.S. Pat. No. 5,032,042 (Shuring et al) describes a fracturing technique to establish preferential flow channels targeting the soil above the water table to enhance vacuum extraction or air injection.

U.S. Pat. No. 5,249,888 (Braithwaite) relies on creating negative pressure (vacuum) in the subsurface and does not require air injection.

U.S. Pat. No. 5,246,309 (Hobby) discloses a closed loop system that relies on negative subsurface pressure to draw and recirculate vapors through the contaminated area. The contaminants in the vapors are treated by the biodegradation effects from micro-organisms in the subsurface and a surface bio-reactor.

U.S. Pat. No. 5,251,700 (Nelson) is a method and device for injecting hot gas under an impermeable surface and into the subsurface using specially adapted wellbore outlets that orient the hot vapor, injected into the soil from a well bore, in a pre-determined or controlled well bore exiting pattern. This method requires dewatering or removal of free flowing water in the soil area or volume of soil prior to remediation.

SUMMARY OF THE INVENTION

Our invention remediates hydrocarbon contaminated soil and/or groundwater within several days or weeks, because the invention has little or no dependence on naturally occurring subsurface limitations. It is the only "active" in-situ decontamination process at the present time that remediates soil and/or groundwater. It also is the only remediation process at this time that can simultaneously apply maximum remediation stress throughout the entire contaminated area/volume.

The invention uses positive pressure to push a gas throughout the entire contaminated area, volume, and media. By pushing the gas, rather than relying on drawing or (vacuum) extraction, all parts of the contaminated area can be simultaneously reached to provide maximum remediation stress, even with subsurface permeability differences. Also by pushing with positive pressure, the influence of subsurface factors such as permeability differences and other site non-homogeneous characteristics can become less important or even inconsequential. A gas such as atmospheric air (80% nitrogen, 20% oxygen) can used because it is readily available. However, other gases could be used.

Thus, a first object of our invention is to apply maximum remediation stress to the entire contaminated area, volume and media by using a predetermined depth and spacing ratio of the air entry points. In unconfined, unconsolidated soils and aquifers, we have found that the entered gas will rise from the air entry point outlet, through the aquifer, and through the soil above the water table, to ground level, and will encompass approximately a 45 degree angle from vertical. Therefore, the plan view radius of influence is the same as the depth of the air entry point outlet. Cross-sectionally, the entire area/volume between vertical and the 45 degree angle will receive maximum remediation stress. The area below this angle/path will not receive remediation stress. The area below this path is referred to as the "dead zone". The point at which air streams from adjacent air entry points co-mingle is called the interference point(s). To accomplish maximum remediation stress throughout the entire contaminated area, volume, and media, proper air entry points depth and spacing can be designed to cause the interference point to be at or below the contamination depth.

We also install air entry points at the perimeter of the contaminated area with the same spacing and depth ratio. Thus, during operation, there will be created a subsurface hydraulic boundary preventing horizontally outward contaminant migration and aiding in an apparent implosion of the contaminated area and volume.

Another feature of invention is the use of a duty cycle. For example, operating for four to five hours, followed by an 8 to 16 hour shutdown period to allow static conditions to return and allow any induced preferential pathways to heal, has resulted in 40 to 50% contaminant removal rates per operating cycle. In permeabilities greater than approximately 20 ft. per day, two cycles per day have resulted in 65% to 75% contaminant reduction/removal per calendar day. Lower permeabilities, such as 0.5 ft. per day, require longer shutdown periods, thereby limiting operations to one operating cycle per day. A continuous operating cycle with no shutdown can also be performed, although better results have been achieved with a shutdown period.

Another object of this invention is simultaneously to remove contaminants from soil and groundwater with the same effort.

Another object of this invention is to remove contaminants from the soil matrix below the water table. If the soil matrix below the water table is not free of contaminants, it can continue to diffuse/leach its contaminants into the groundwater present in the adjacent pore space. In a short period of time, this will contaminate, re-contaminate, or contribute to contaminant levels in the groundwater.

Another object of this invention is to eliminate or reduce construction expense of burying flow lines and feeder lines. Since the remediation occurs so rapidly, the required surface equipment can be temporary and portable, including temporary above-ground lines, hoses and piping. Another advantage of this invention is that it can rehabilitate petroleum-contaminated sites in days and weeks, as opposed to years and decades, especially by the use of compressed gas (e.g., compressed air).

Another object of this invention is to eliminate the need for removal of groundwater or soil to accomplish site rehabilitation.

Another object of this invention is to reach many regulatory remediation target levels which are measured in micrograms-per-liter or parts-per-billion. These regulatory target levels have often been considered impossible to achieve and maintain.

Another advantage of this invention is that it actually has been implemented, and has repeatedly reduced contaminant concentrations to 1 micrograms-per-liter (parts-per-billion), and less, in short time frames. Thus, contaminant reduction/removal rates are not projections or speculations.

Another object of this invention is to reduce the meaningfulness of subsurface variables, as implementation of the invention focuses on contaminant depth as the primary consideration. Its "active" nature overcomes obstacles that are major considerations when using prior art "passive" techniques.

Another advantage of this invention is that application of negative pressure to the subsurface via vacuum extraction is neither necessary nor relied upon.

Another advantage of this invention is that it does not require an impermeable surface.

Another advantage of this invention is that it does not imply or rely on biodegradation effects.

Another advantage of this invention is that it is an "active remediation method". It takes control of the subsurface as opposed to influencing it. It does not rely on mother nature's yield or naturally occurring rates of transfer or change.

Another advantage of this invention is that it puts maximum remediation stress throughout the entire contaminated area simultaneously.

Another advantage of this invention is that it can use readily available atmospheric air.

In addition to our invention's use in soil (unconsolidated sediments) and unconfined aquifer, it can also be applied to consolidated sediments (bed rock) and confined and semi-confined aquifer.

PREFERRED EMBODIMENTS OF THE INVENTION

The following descriptions of the preferred embodiments are exemplary in nature and are not intended to limit the invention's scope, use or applicability.

According to the preferred embodiment of this invention, it is disclosed that forced air entry into the subsurface via multiple air entry points occurs. It is further disclosed that the forced air entry should not normally be subjected to any pressure limitations. Approximately 10 to 50 cubic feet per minute (cfm) per entry point has been normally preferred but not limited to these volumes. As entered air is forced to the surface, it captures (strips) and carries contaminants from the groundwater, captures (strips) and carries contaminants from the soil matrix below the groundwater table, and captures (strips) and carries contaminants from the soil above the water table.

Figure 1:
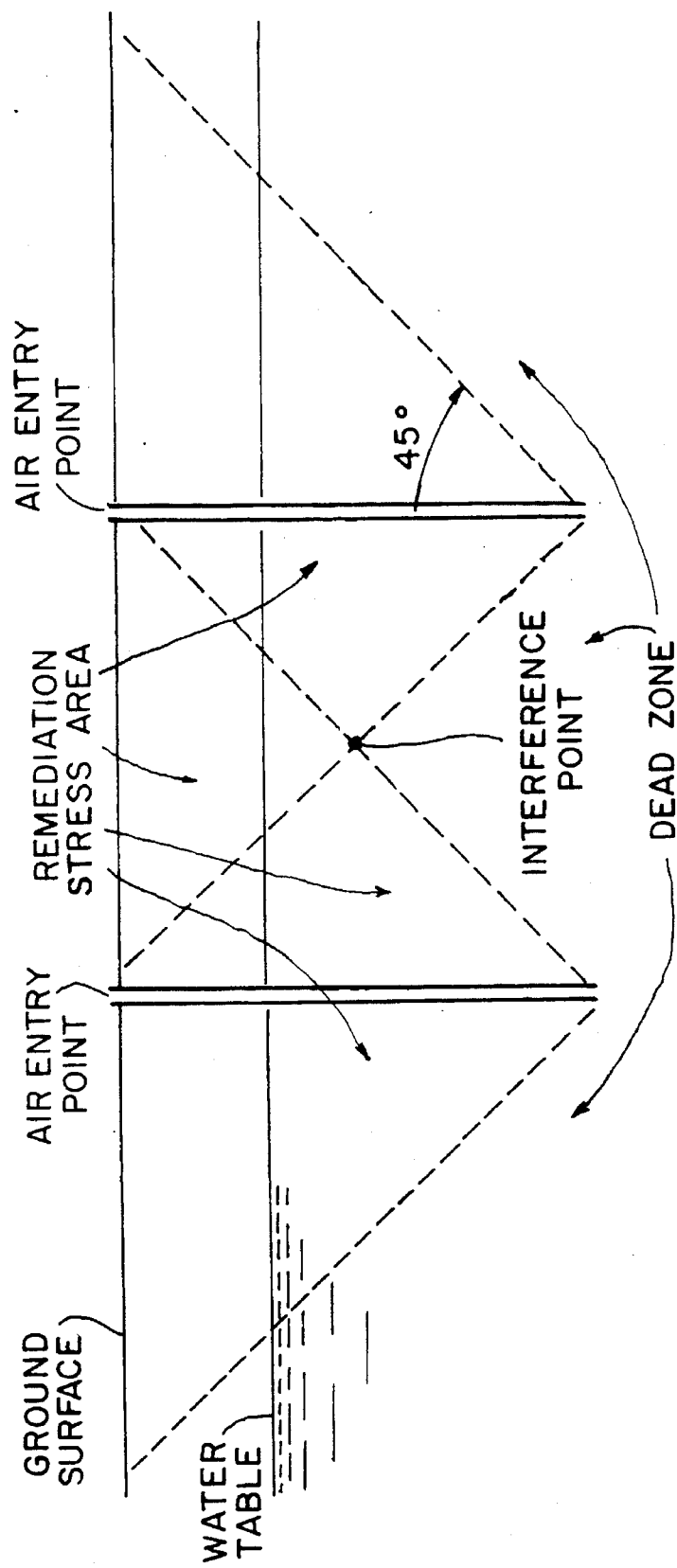
FIG. 1 is cross-sectional view of the subsurface situation during operation with respect to the vertical extent of contamination. It shows the area undergoing remediation stress, and the area not receiving remediation stress (dead zone). This figure also shows the operation using vertical air entry points, and remediation of: groundwater, soil matrix within the groundwater aquifer, and soil above the water table. It also shows the interference point located below the deepest contamination.
Figure 2:
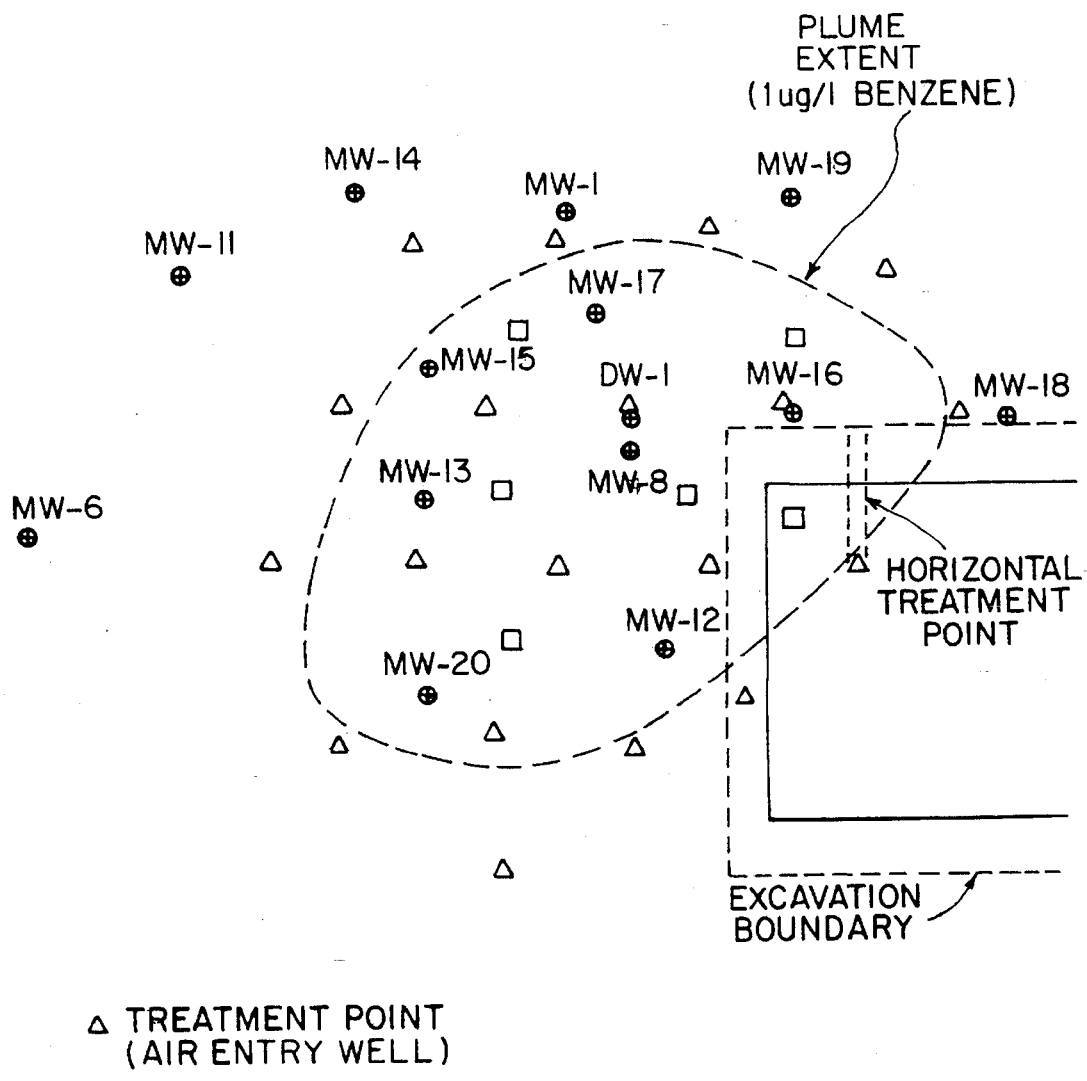
FIGS. 2 and 3 are plan views showing the location of the air entry points with respect to the horizontal extent of contamination. They also show locating a number of air entry points at the edge or outside the horizontal boundary of contamination to assure prevention of any outward contaminant migration during the operation.
Figure 3:
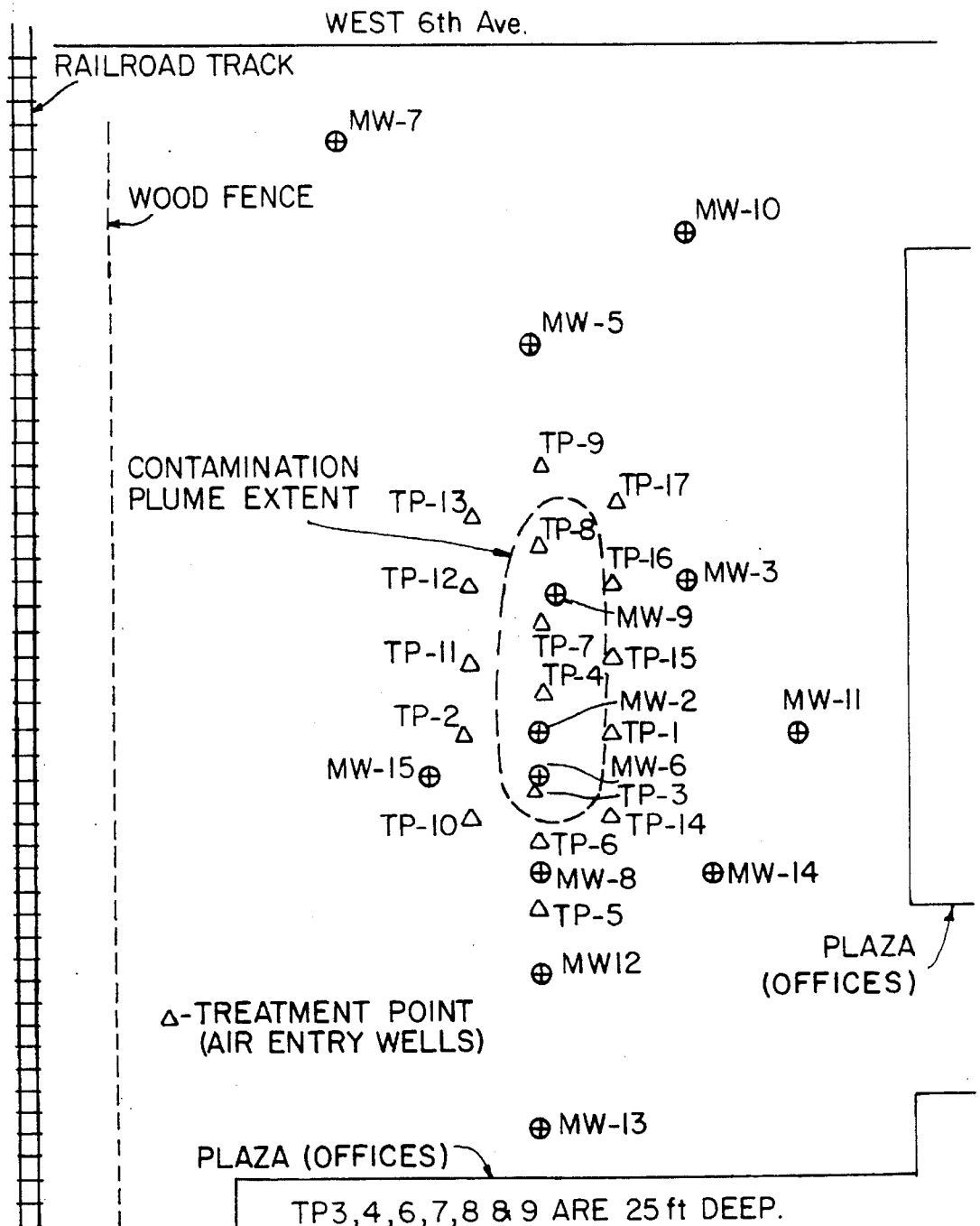

Referring to FIG. 1, and determining a maximum contaminant depth below ground surface of 11 feet, the interference point between air streams should be no shallower that 11 feet below land surface. To establish the interference point at 11 ft below ground level, vertical air entry points with 2.5 to 5 ft of screen (outlet) on bottom, can be installed 18 feet deep and 18 ft apart. Another way to establish the interference point at 11 feet below ground level, could be to install vertical air entry points to a depth of 24 feet spaced 26 feet apart. Other combinations are also possible, so long as the outletting air's rise over run of 1 ft of rise per 1 ft of run (45 degree angle) is used in the air entry point depth to spacing design. Also, referring to FIGS. 2 and 3, there can be air entry points with the same depth to spacing relationship installed at or outside the contaminant boundary to assure no horizontal contaminant migration. The same design parameters can be used with horizontal air entry points illustrated in FIG. 4, and with the directional air entry points illustrated in FIG. 5.

In situations where the aquifer and soil above the aquifer both contain contaminants, the aquifer should be the primary target for remediation. The gas (air) moves upward through the aquifer and through the soil zone above the water table, also addressing the contamination in the soil zone as well as contamination in the aquifer.

Figure 4:
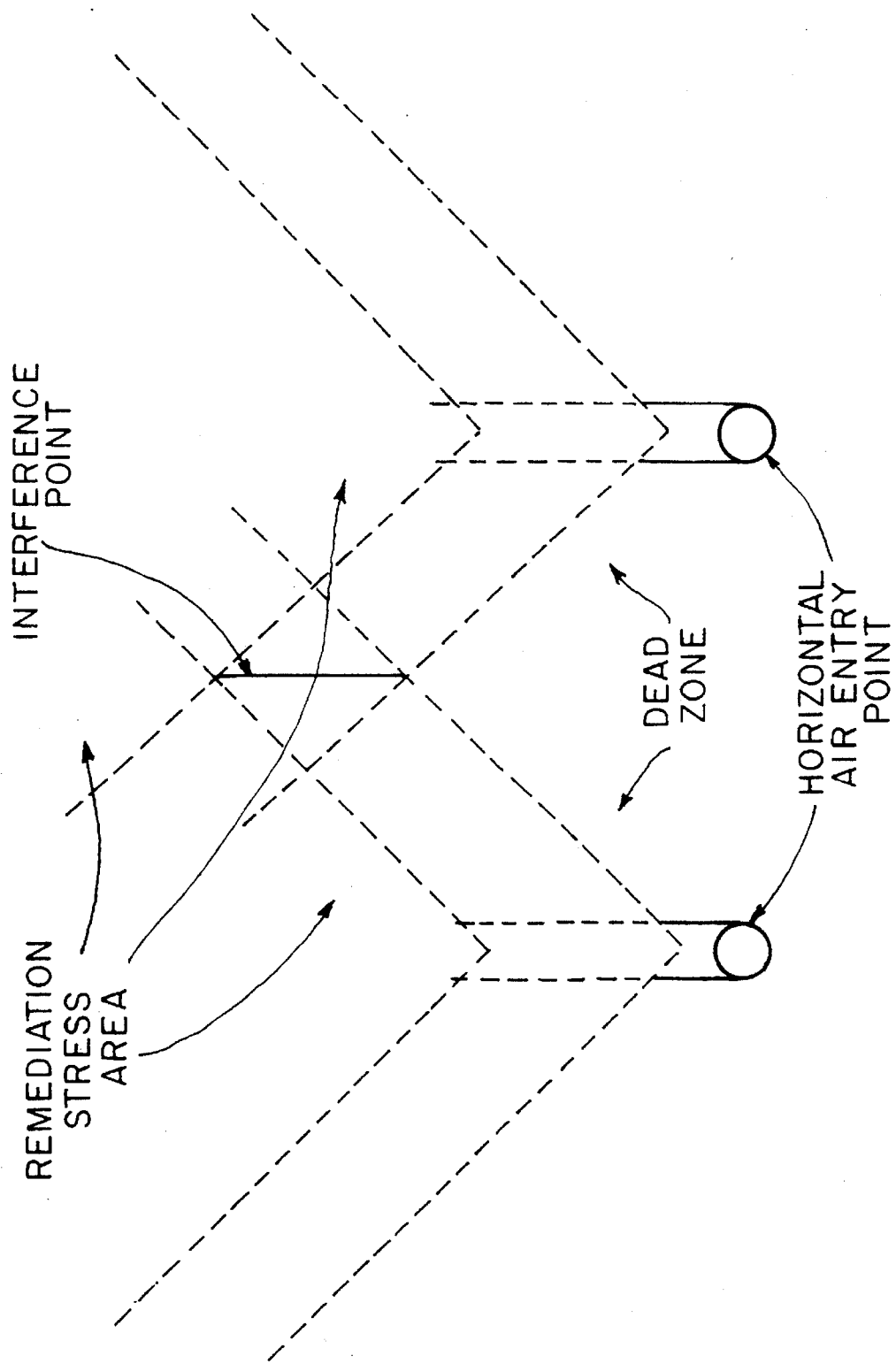
FIG. 4 is an example of using horizontal air entry points.
Figure 5:
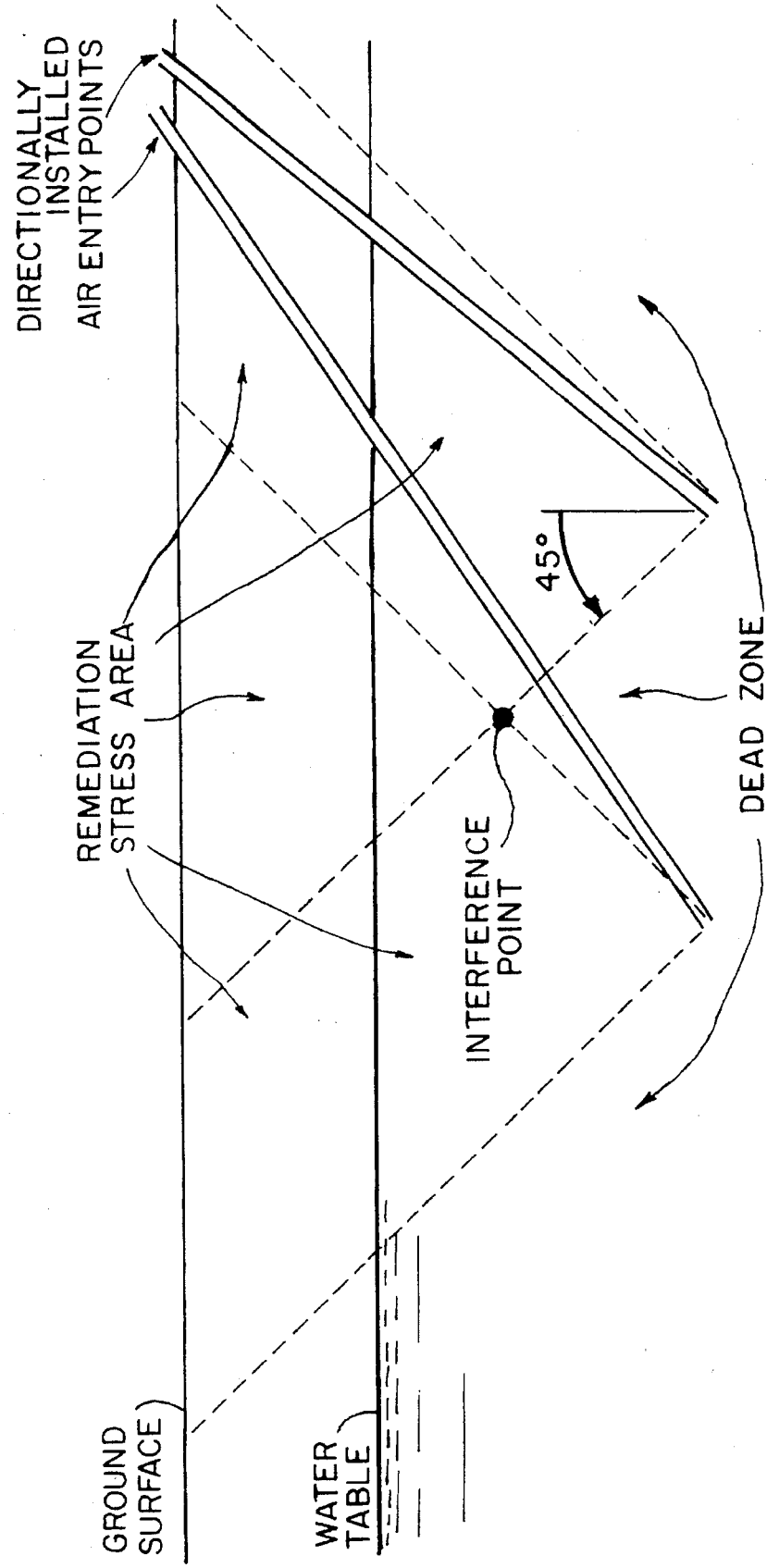
FIG. 5 is like FIGS. 1 and 4, but showing directionally drilled entry wells.

Horizontal and/or directionally drilled air entry points can also be used. FIG. 4 represents the cross-sectional view of the area being remediated using horizontal air entry points, and FIG. 5 using directional (inclined between the vertical and the horizontal) air entry points.

Figure 6:
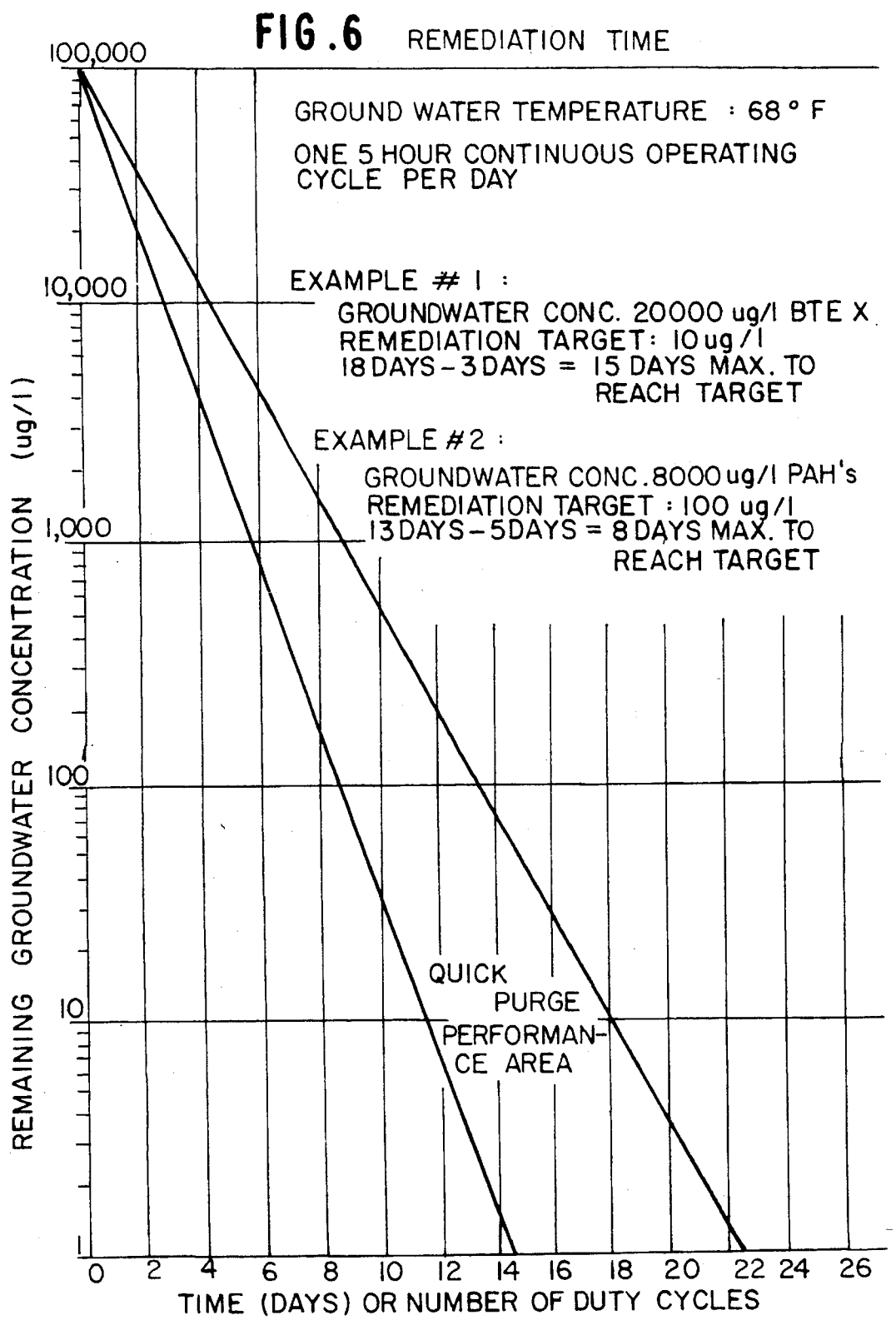
FIG. 6 shows this invention's empirical contaminant remainders for groundwater to predict operating time needed to reach remediation target concentrations. The presented data are from actual sites in Florida.
Figure 7:
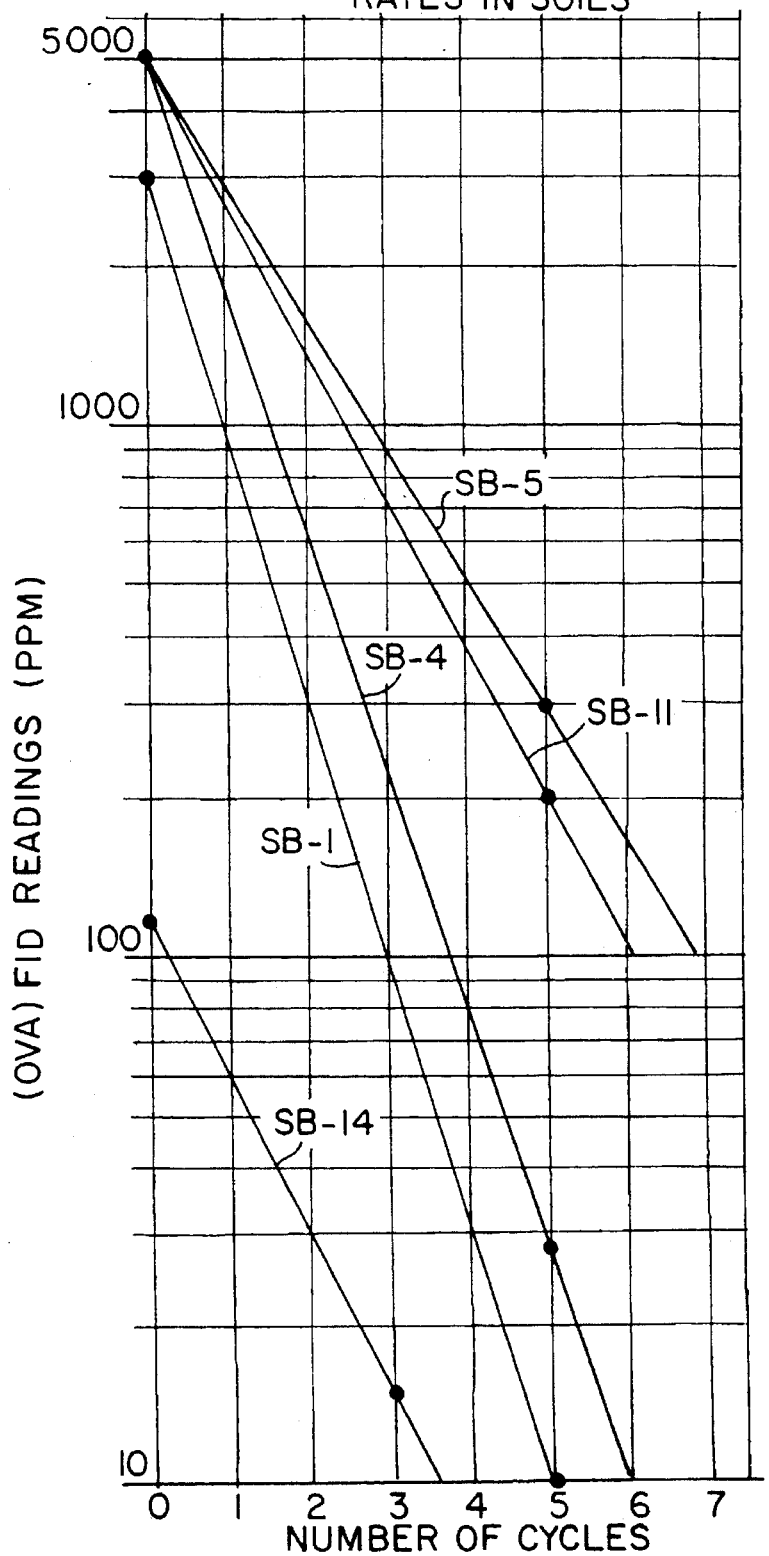
FIG. 7 is applicable to soils. It is from an actual site in Florida where contaminant reduction in soil above the water table was measured. Two 4 hour duty cycles per day separated by 8 hour rest periods were performed. It has the same contaminant removal rates as groundwater.
Figure 8:
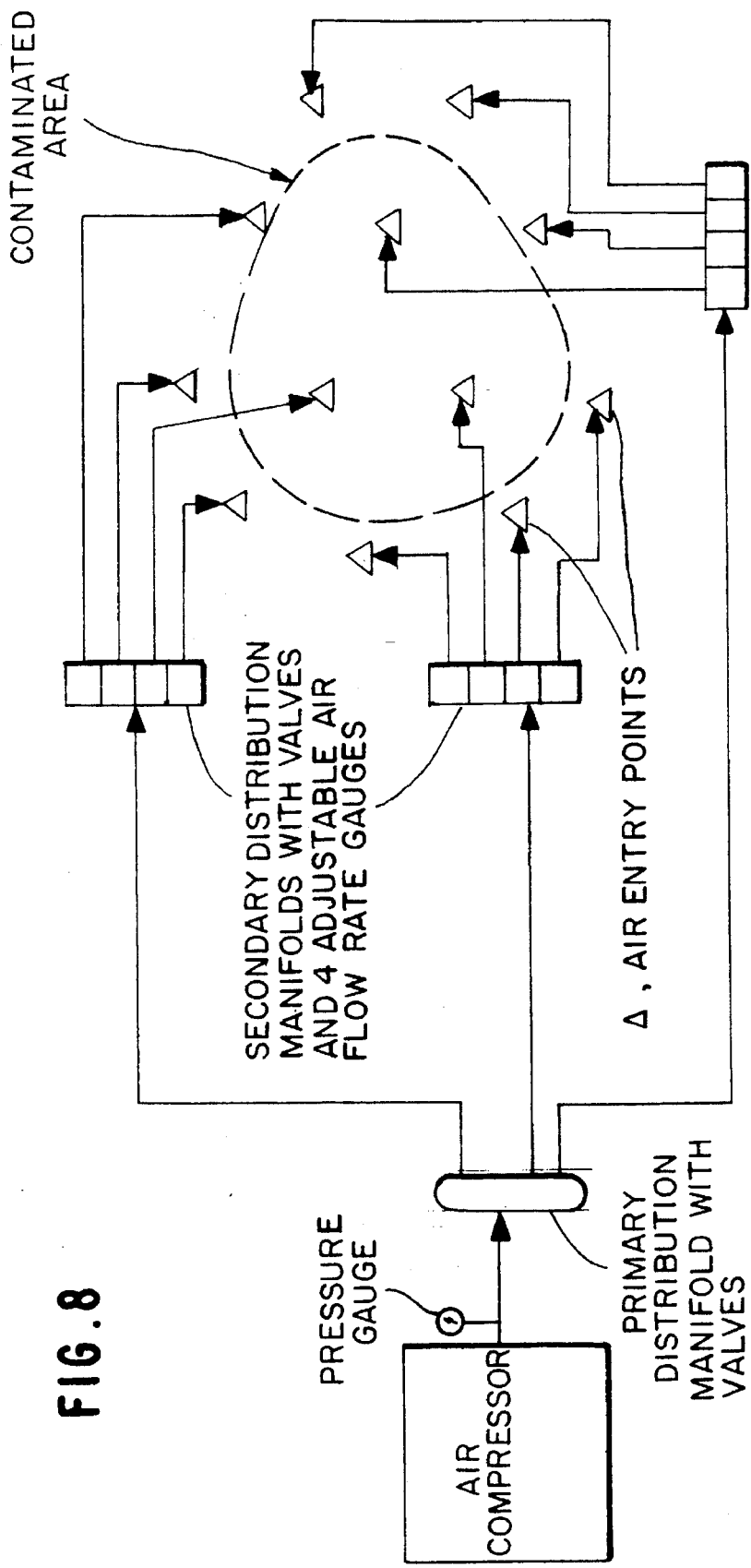
FIG. 8 is a schematic diagram illustrating apparatus for implementing the decontaminated process illustrated in FIGS. 1–7.
Figure 10:
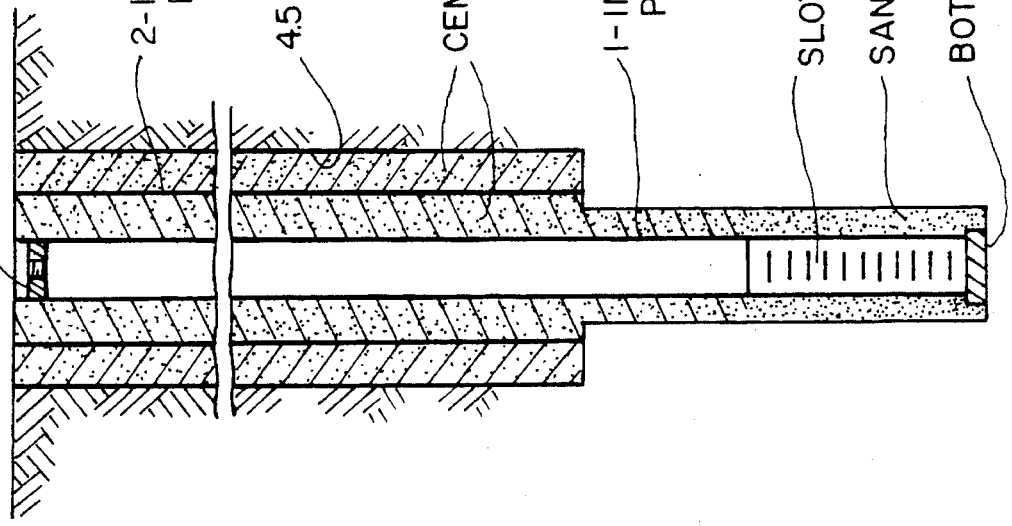
FIGS. 9 and 10 are cross-sectional views of typical vertical air entry well constructions.
Figure 9:
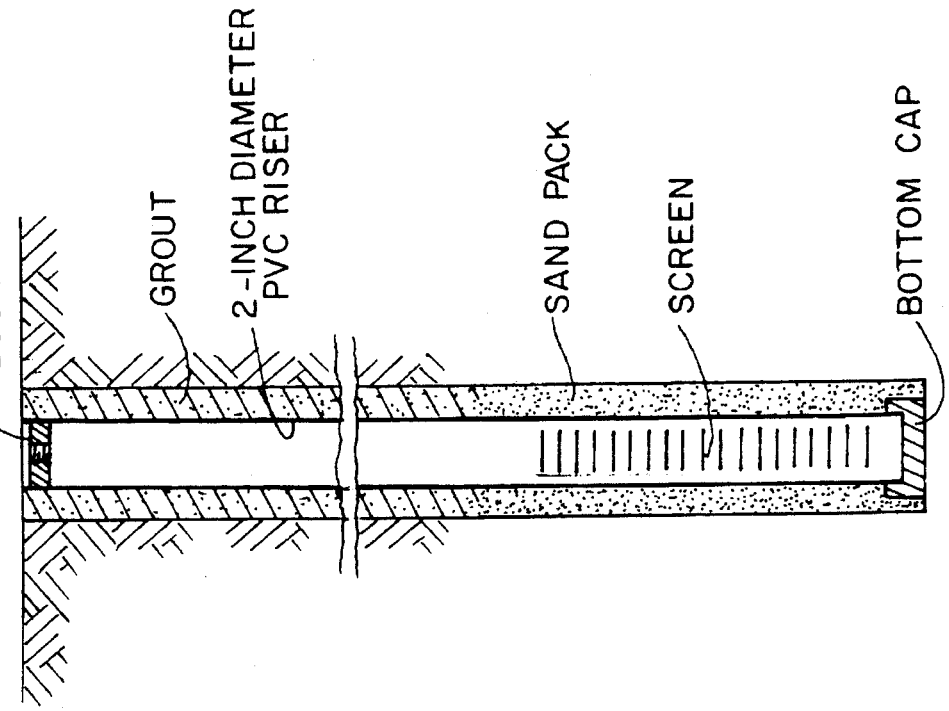

Use of a duty cycle for removal and shutdown period for accumulation/equilibria purposes enhances contaminant removal. FIG. 6 demonstrates this by showing empirical results from this invention's case histories on groundwater. FIG. 7 is a case history of contaminant reduction rates in soil above the water table as measured by an Organic Vapor Analyzer with a Flame Ionization Detector. Note that 50% reduction of the remaining contaminants per duty cycle is normal for groundwater and/or soil. If the site's permeability is approximately 20 ft. per day or greater, two cycles per day may be possible (with approximately 8 hours shutdown period in between) resulting in up to 75 % reduction/removal of contamination per calendar day.

Compressed atmospheric air is the preferred entry gas due to its abundant availability and low cost. However, other gases, such as nitrogen and carbon dioxide, could be used.

In the preferred embodiment, all portions of the entire contaminated area, both vertically and horizontally, simultaneously receive maximum remediation stress.

If air emissions at the surface exceed regulatory standards, the emissions can be captured and/or treated via various methods.

The range of air entry flow rates at most sites needed to accomplish optimum subsurface mass transfer of contaminants is typically between 0.04 and 0.1 cubic feet per minute per square foot of each air entry point's area of coverage, with 0.08 cfm/sq ft appearing to be an all purpose design. The areal coverage for each air entry point can be approximated by first determining the horizontal distance from each entry point to its adjacent interference points. In FIG. 1 this would be 9 feet. Creating a square around this air entry point would result in an area of (9+9) times (9+9) or 324 square feet. This area multiplied by 0.04 cfm/sq ft to 0.1 cfm/sq ft. results in an air entry rate design for the air entry point of 13 cfm to 32 cfm. Another estimation of areal coverage in FIG. 1 is to use a circular pattern around the air entry point with a radius of 9 feet, resulting in an areas of (9×9×3.14) or 254 square feet. This area multiplied by 0.04 cfm/sq. ft. to 0.1 cfm/sq. ft. results in an air entry rate design for the air entry point of 10 cfm to 25 cfm. The effectiveness of lower air entry rates may become more susceptible to the influences of a site's permeability variations. Higher air entry rates are less susceptible. The use of greater than 0.1 cfm/sq. ft. or even large amounts of overkill does not appear to do harm to the mass transfer process and provides assurances that maximum contaminant removal rates are occurring.

There is some field evidence indicating that large amounts of overkill, meaning increasing the cfm per air entry point, can increase the angle to the interference point(s). This would cause the interference point(s) to occur deeper. The horizontal distance from the air entry point to the interference point(s) would still remain the same.

In the preferred embodiment, compressed air is used to achieve the desired air flow rate to obtain stripping of the contaminants. We have used Ingersoll Rand compressors rated from 100 CFM to 750 CFM at 100 PSI, and an Atlas Copco compressor rated at 1100 CFM/100 PSI. Where appropriate, a blower can be used to supply the air, if it has a sufficient PSI rating. The use of compressed air in the preferred embodiment is a very important feature of our invention, and we have chosen air compressors whose PSI rating is more than enough to produce a flow rate (cfm) sufficient to accomplish the high speed stripping and purging which provide the great advantages and unexpected results of our invention.

While we have described one or more preferred embodiments of our invention, it should be understood that obvious variations thereof are within the scope of the invention which is limited only as defined by the following claims.

What is claimed is:

1. A method of rapid purging of contaminants from a contaminated zone of soil or ground water which is located beneath a surface of the earth, said contaminants including hydrocarbon constituents associated with diesel fuel, gasoline, kerosene, solvents and creosote, said method comprising the steps of:

forming at least two bore holes extending at a depth beneath said zone;

forcing a gas into said two bore holes and into said contaminated zone so that said gas exits said bore holes and flows along paths upwardly from said bore holes to said surface in volumes each having a shape approximately that of an inverted cone having (1) a vertex at a gas-exit portion of each bore hole and (2) a conical surface of revolution about an axis;

spacing said two bore holes apart by a predetermined distance such that the conical surfaces intersect at an interference point that is at a level which is at or beneath said contaminated zone to be purged; and selecting a range of gas flow rates for the gas-forcing step so that the contaminants are stripped from said soil or water, via a mass-transfer process, by the flowing gas, thereby placing the entire zone under maximum remediation stress.

2. The method as defined in claim 1, wherein, at least at and below said interference point, said cone has a surface of revolution having a circumference defining a circular base.

3. The method as defined in claim 2, further comprising choosing said distance so that a line from said vertex to the circumference of said circular base forms an angle of approximately 45° with the axis of revolution of each cone.

4. The method as defined in claim 3, further comprising forming said two bore holes so that they extend vertically to said depth beneath said contaminated area.

5. The method as defined in claim 4, wherein said spacing distance is equal to or less than twice said depth.

6. The method as defined in claim 5, wherein said forcing step comprises forcing a gas under positive pressure into said two bore holes, and wherein said gas flows upwardly, without application of any vacuum or negative pressure, along said paths to said surface.

7. The method as defined in claim 5, wherein said gas is atmospheric air.

8. The method as defined in claim 7, wherein said contaminated zone is below a water table in the earth.

9. The method as defined in claim 8, wherein said surface of the earth remains exposed to the earth's atmosphere throughout the performance of said steps.

10. The method as defined in claim 9, wherein said level is entirely beneath said contaminated zone.

11. The method as defined in claim 10, wherein the contaminants are stripped from said soil or water without heating the contaminants.

12. The method as defined in claim 11, wherein said contaminants are purged from said contaminated zone only by stripping, via said mass-transfer, and without biodegradation of the contaminants.

13. The method as defined in claim 4, wherein said forcing step comprises forcing a gas under positive pressure into said two bore holes, and wherein said gas flows upwardly, without application of any vacuum or negative pressure, along said paths to said surface.

14. The method as defined in claim 3, wherein said forcing step comprises forcing a gas under positive pressure into said two bore holes, and wherein said gas flows upwardly, without application of any vacuum or negative pressure, along said paths to said surface.

15. The method as defined in claim 3, wherein said gas is atmospheric air.

16. The method as defined in claim 2, further comprising forming said two bore holes so that they extend horizontally beneath said contaminated zone.

17. The method as defined in claim 16, wherein said forcing step comprises forcing a gas under positive pressure into said two bore holes, and wherein said gas flows upwardly, without application of any vacuum or negative pressure, along said paths to said surface.

18. The method as defined in claim 2, further comprising forming said two bore holes so that they extend in a direction between horizontal and vertical to said surface.

19. The method as defined in claim 18, wherein said forcing step comprises forcing a gas under positive pressure into said two bore holes, and wherein said gas flows upwardly, without application of any vacuum or negative pressure, along said paths to said surface.

20. The method as defined in claim 1, wherein the gas at the entrance of each bore hole has a flow rate from approximately 0.04 to 0.1 cubic feet per minute per square foot of each bore hole's area of coverage.

21. The method as defined in claim 1, further comprising the steps of terminating said purging, after a first time period of operation, for a second time period sufficient to allow static conditions to return and to allow any induced preferential pathways to heal, before again initiating said purging.

22. The method as defined in claim 21, wherein said forcing step comprises forcing a gas under positive pressure into said two bore holes, and wherein said gas flows upwardly, without application of any vacuum or negative pressure, along said paths to said surface.

23. The method as defined in claim 1, further comprising the step of forming additional said bore holes around a boundary perimeter of said contaminated zone to prevent horizontal contaminant migration.

24. The method as defined in claim 1, further comprising the step of choosing said distance to be equal to or less than twice said depth.

25. The method as defined in claim 1, wherein said forcing step comprises forcing a gas under positive pressure into said two bore holes, and wherein said gas flows upwardly, without application of any vacuum or negative pressure, along said paths to said surface.

26. The method as defined in claim 1, wherein said gas is atmospheric air.

27. The method as defined in claim 1, wherein said contaminated zone is below a water table in the earth.

28. The method as defined in claim 1, wherein said surface of the earth remains exposed to the earth's atmosphere throughout the performance of said steps.

29. The method as defined in claim 1, wherein said level is entirely beneath said contaminated zone.

30. The method as defined in claim 1, wherein said contaminants are purged from said contaminated zone only by stripping, via said mass-transfer, and without biodegradation of the contaminants.

* * * * *